Dec. 29, 1959  H. J. BROWN  2,919,408
ELECTRONIC WATTHOUR METER
Filed Aug. 23, 1957
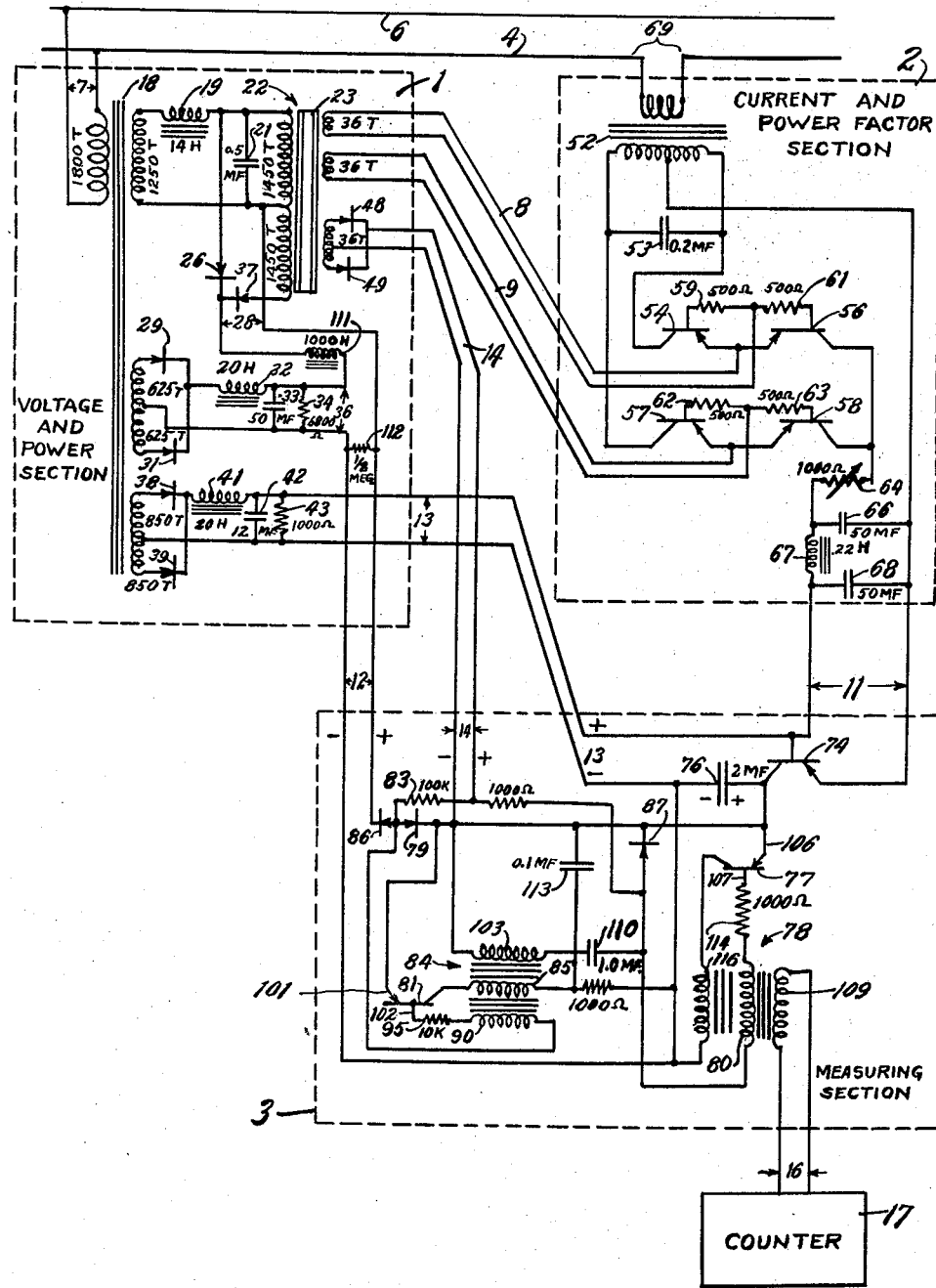
INVENTOR.
Harold J. Brown
BY
Jones, Darbo & Robertson
Attys.

United States Patent Office 2,919,408
Patented Dec. 29, 1959

2,919,408

ELECTRONIC WATTHOUR METER

Harold J. Brown, Indianapolis, Ind.

Application August 23, 1957, Serial No. 679,931

4 Claims. (Cl. 324—142)

Although millions of watthour meters of the rotating disc type found in almost every home are in use and give very satisfactory performance according to present standards, the present invention provides an electronic watthour meter having great advantages over the conventional type.

Having no moving parts in its measuring section, and having no permanent magnet, an electronic meter is entirely free of various causes of departures from accuracy to which the conventional meters are inherently subject, and also avoids many manufacturing troubles. The range over which measurement is accurate can easily be considerably wider than that which has been achieved in conventional meters only by many years of research and development. The electronic meter provides a new area of development which may be expected to ultimately result in a meter which, as compared to a conventional meter, will be less expensive to manufacture, more rugged and able to withstand rough handling in shipping, and is more compact so as to save space both in storage and on the wall.

Additional objects and advantages of the present invention will be apparent from the following description and from the drawings.

*Background fundamentals*

An understanding of this invention by one whose knowledge of theory is not constantly in use may be aided by a discussion of the fundamentals. The unit of power used in an electric circuit is a watt. Perhaps everyone realizes that a 300 watt light bulb uses three times the power of a 100 watt light bulb. If a volt meter should be connected across the wires supplying a lighting circuit and if an ammeter (ampere meter) should be connected in the circuit, the wattage (power consumption) could be determined by multiplying the two indications together. A watt meter connected properly to the circuit would also indicate the same value.

If a motor should now be connected to the circuit, the product derived by multiplying the volt meter reading by the ammeter reading would no longer quite equal the watt meter reading. This is because the motor causes a phase displacement between the voltage and the amperage or current, this discussion relating only to alternating current circuits.

In alternating current circuits, both the voltage and the current are reversed many times a second. In common "sixty cycle A.C." each is reversed 120 times per second. Each change is gradual and may be represented graphically by a sine wave. The peak of each wave represents a maximum voltage or a maximum current during the cycle. When the kind of load on the circuit produces a phase displacement, the current peak does not occur simultaneously with the voltage peak. Because a complete cycle may be represented as 360 degrees, the portion of the cycle by which the two peaks are separated or displaced may also be represented by a number of degrees or an angle. This may be called a phase displacement angle, or more briefly, a phase angle.

The true power consumption in a circuit is the volts times the amperes times a certain mathematical value or "power factor" determined by the amount or angle of phase displacement. It is probably not necessary for an understanding of this invention to know that this mathematical value is in mathematical terms the cosine of the phase displacement angle. This value may be referred to herein either by that mathematical expression or as "P.F.," standing for "power factor."

A watt meter automatically takes into consideration the phase displacement angle just as if it multiplied the voltage by the amperage, and the product by the cosine of that angle.

A watthour meter, such as the ordinary home electricity meter, satisfies all of the watt meter requirements and in addition takes into consideration the element of time. When a light bulb is used at 100 watts for an hour it has used 100 watt hours. If the lamp bulb is lit for 10 hours, it will have used 1000 watt hours or a kilowatt hour. A watthour meter properly connected to its circuit would so indicate.

As a watt is a unit of power (rate of energy consumption) a watthour is the unit of energy (total amount consumed), but this distinction probably need not be kept in mind to understand this invention.

*Nature of drawing*

The drawing is a circuit diagram of the form of the invention chosen for illustration with broken line rectangles superimposed thereon to facilitate reference to certain main sections.

Although the following disclosure offered for public dissemination is detailed to ensure adequacy and aid understanding, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

*General description*

The invention can probably be more easily understood if the illustrated form of watthour meter is considered to be broken down into main sections 1, 2, and 3 as represented by rectangular broken lines in the drawings. Part 1, which may be called the voltage and power section, is connected across the two main wires 4 and 6 of the circuit being measured, which has been illustrated as a simple two-wire circuit. Thus the input to the section 1 may be considered the voltage 7. The numeral 7 could be referred to as designating a pair of wires, but it is believed that the explanation will be clearer if functional designations, such as "the voltage 7" are used here and elsewhere.

Section 2 could be called the current section. It is connected in the circuit, the current through main circuit wire 4 having to pass through an element in section 2 for evaluation of the amperes or amount of current flowing through the measured circuit 6, 4.

Section 3 can be called the measuring section.

The voltage or power section 1 has five outputs, represented by pairs of wires. Outputs 8 and 9 are square wave phase-indicating outputs used in section 2 for accomplishing the function corresponding to multiplying the current or amperage by the power factor. The output 11 of the section 2 therefore represents the "current×P.F." value, being proportional to that value.

According to theory, the "current×P.F." value must be multiplied by the voltage to give watts, or (with continuance for an hour) watthours. This is, in effect, accomplished in section 3, which has two main inputs 11 and 12, besides auxiliary inputs 13 and 14 enabling it to function. Input 12 is one of the outputs of section 1, and is called the "inverse voltage" because it varies in inverse proportion to the voltage in measured circuit 6, 4. As will be explained later, section 3 utilizes its "current×P.F." input 11 together with its inverse voltage input 12 to utilize a measuring capacitor 76 therein to, in effect, "measure out" equal quantities or units of energy. As each one is measured, an impulse is transmitted at 16 to counter 17. When enough impulses have been counted to make up a kilowatt hour, the reading of the counter will advance one kilowatt hour. A more technical term for the measuring capacitor 76 is integrating capacitor.

Voltage and power section

We now consider section 1 in more detail. It shows one form of circuit which will adequately perform the functions indicated for this section, above. This form includes a power supply circuit, a linear potential transformer 18 of which the secondary is connected to a linear inductor 19, and a capacitor 21 chosen with such values as to be in approximate series resonance at the frequency of line voltage 7. A saturable transformer 22 is connected across capacitor 21. The saturable transformer 22 so far used has a tape-wound gapless core 23 having square loop properties. Rectifiers 26 and 37 are connected as shown and provide a D.C. voltage at 28. Due to the described use of the saturable transformer 22, the value of D.C. voltage 28 is independent of the expected fluctuations of line voltage 7, that is, it is substantially constant.

Another secondary coil 20 on the potential transformer 18 also is connected to rectifiers 29 and 31, filter elements 32 and 33, and a bleeder resistance 34, to provide D.C. voltage 36. The D.C. voltage 36 is proportional to the A.C. line voltage 7. The values producing the D.C. voltage 36 are designed so that this voltage is one half the value of the D.C. voltage 28 at the nominal value of the A.C. line voltage 7.

The inverse voltage 12 is obtained by opposing the constant voltage 28 with the variable voltage 36. The reference voltage 12 will then vary inversely to the line voltage 7 as it fluctuates.

The potential transformer 18 has a third secondary coil 40 which energizes rectifiers 38 and 39 and filter elements 41 and 42 and the bleeder 43 to provide the power supply voltage 13.

Secondary coils of the saturable transformer 22 provides square wave A.C. voltages 8 and 9. Another secondary coil of transformer 22, in conjunction with rectifiers 48 and 49 provides biasing voltage 14.

Current and power factor section

In the part of the drawing indicated by a broken line as section 2 is found a current transformer 52, capacitor 53, transistors 54, 56, 57, and 58, resistances 59, 61, 62, and 63, and filter elements 64, 66, 67, and 68.

The line current 69 being measured is the main input to section 2, energizing the current transformer 52. As explained under the heading "General Description" this section 2 produces an output 11 which is proportional to "current×P.F." This conversion from the current input 69 to "current×P.F." output 11 is accomplished by a power factor network including especially the transistors 54, 56, 57, and 58.

Although the power factor network has two sections, shown in the drawings as upper and lower sections, its function can be understood more easily by considering only one of them, such as that including transistors 54 and 56. This section acts as an electronic valve which (under control of voltage 8) is closed for half a cycle and fully open for the other half cycle. If there is no phase displacement between the voltage and current, this valve is fully open during the entire time (half cycle) that the current flow is in one direction, and all of this current flow is passed on to the output 11. However, if the current lags the voltage, closing of the valve at the end of a half cycle will cut-off some of the current flow, and to that extent reduce the transmission of current flow to the output 11. However, the transmission to output 11 is reduced by more than this amount because the valve also opens a little early, while the current is flowing in the opposite direction. This amount of current flowing in the opposite direction is in effect subtracted from the amount flowing in the first direction considered, so that the net amount of current flow transmitted to output 11 is reduced by the amount of current flow cut-off at one end of the cycle and the same amount of current flowing in the reverse direction subtracted at the other end of the cycle. Hence the total reduction is twice the quantity cut-off at one end by the phase displacement.

It happens to be a mathematic phenomenon that if the wave is of true sine wave shape the foregoing reduction gives the same results that would be reached by multiplying the current value by the power factor or cosine of the angle of phase displacement. The wave shape of ordinary alternating current is either a true sine wave or so close to it that no significant errors are introduced. Hence, output 11 is proportional to "current×P.F."

The lower section operates in the same way during the alternate voltage half cycles, so as to give full wave action with inherent rectification. The filter including elements 64, 66, 67, and 68 provides a reasonably smooth direct current.

The foregoing discussion assumes that the phase-controlled valving produced by inputs 8 and 9 have exactly the same phase relation to the currents valved as the phase relationship of voltage and current in the measured circuit 4, 6. This exactitude is accomplished by the phase-correcting capacitor 53.

Measuring section

Main elements of the measuring section 3 are an amplifying transistor 74 and a measuring capacitor 76. The "current×P.F." current 11, which is the output of section 2, controls transistor 74 to cause power input 13 (a section 1 output) to charge measuring capacitor 76 at a rate in proportion to the value of "current×P.F." The remainder of section 3 is largely concerned with causing capacitor 76 to discharge (and operate counter 17) as soon as it has been "filled" to a level indicating consumption of a unit of energy.

In operation, assuming capacitor 76 has just discharged, the main discharge circuit of capacitor 76, through transistor 77 and transformer 78, must be blocked. This is accomplished by biasing voltage 14 the positive side of which is applied to terminal 107 of the transistor 77 through coil 80 of transformer 78. The discharge triggering circuit of measuring capacitor 76 must also be blocked, this being the circuit controlled by transistor 81, through coil 85 of transformer 84. This is also blocked by voltage from the positive side of biasing voltage 14, applied to terminal 102 of transistor 81 through coil 90 of transformer 84. The charging of measuring capacitor 76 will now start, under control of transistor 74 as described.

The voltage across capacitor 76 always directly opposes inverse voltage 12. The positive side of the voltage across capacitor 76 seeks to make current flow through blocking diode 86, but will succeed in doing so only when this voltage is greater than the inverse voltage 12 which opposes this flow. Diode 86 will not permit flow in the opposite direction. The negative terminal of the capacitor 76 is connected to the negative terminal of the inverse voltage 12, thus completing the circuit in which voltage 12 opposes the voltage across capacitor 76 (the circuit in which current will flow when ultimately it flows through diode 86). When the critical voltage at capacitor 76 is reached, it causes a flow of current through diode 86. It may be assumed that this current flow through diode 86 is quite small. In that event, it need not be thought of as reaching diode 86 by flowing through diode 79 but merely as diverting the current normally flowing in the biasing diode 79 through resistor 83 from source 14. This diversion robs transistor 81 of much or all of its positive base voltage, only a very small voltage being available through high resistance 83. The result is to unbias transistor 81 so that current can flow through coil 85 and transistor 81 under the influence of the voltage of capacitor 113 which has been charged in the meantime along with capacitor 76.

Because of the well known amplifying effect of transistors the current flow from capacitor 113 through coil 85 and transistor 81 will be relatively heavy. It induces the voltage in coil 103 of transformer 84 which similarly unbiases transistor 77 by causing a current flow through the path formed by contact 106, contact 107, resistor 114, coil 80, and capacitor 110. This unbiasing of transistor 77 causes measuring capacitor 76 to discharge through coil 116, transistor 77, resistance 114, coil 80 and diode 87. The energy of this discharge is largely dissipated in resistor 114. Likewise, the energy of discharge of capacitor 113 is largely dissipated in resistor 95. After the discharge, the positive biasing voltage 14 assumes control of the transistors 81 and 77 so that conduction ceases through the discharge circuits. The initiation of recharge of capacitors 76 and 113, which now follows, is the beginning of the new cycle.

The discharging current from capacitor 76 through coil 116 induces a voltage in coil 109 of transformer 78, thus producing an output pulse at 16 to operate counter 17. The counter 17 is thus actuated once for each discharge and therefore counts the units of energy "measured out" by capacitor 76.

If reference voltage 12 were a constant voltage, the meter would fail to be an accurate watthour meter because a given "current×P.F." value would produce the same number of pulses 16 per hour with a low line voltage 7 as with a high line voltage. Because the fluctuations of voltage 7 are relatively small it is practical to compensate for them by making reference voltage 12 inversely proportional to line voltage 7, as indicated, so that with high voltage at 7, inverse voltage 12 is more easily overpowered by voltage across capacitor 76. This capacitor therefore discharges at a lower voltage (and therefore proportionally more frequently, assuming a constant value of current×P.F.).

The counter 17 may be any suitable type of counter, either electro-mechanical or electronic, which registers the number of cycles in a given period of time. The number of cycles thus registered will be proportional to the total energy which has passed through this circuit. The counter may be calibrated to register directly in terms of watthours.

Conventional apparatus for analogue multiplication techniques disclosed in the prior art are complex and expensive. The circuit of the invention presently disclosed, however, by-passes many of these difficulties by taking advantage of the fact that the line voltage of conventional supply circuits is relatively constant. Thus it is not necessary to be constantly multiplying the current by the instantaneous voltage. Instead a voltage is produced which is inversely proportional to the line voltage, and by regulating the point at which the integrating or measuring capacitor will discharge, the voltage factor is indirectly introduced.

This method of multiplying by the voltage results in the use of a much simpler circuit requiring considerably fewer components and making possible the inclusion of all the components within a compact space, thus contributing to making an electronic watthour meter practical.

Transistors are preferred over electronic tubes for the present application for sevaral reasons. They maintain their characteristics over a much greater period of time than electron tubes and do not require as frequent checking or replacement. This is especially important for meters distributed through the countryside at all the locations of electric power consumption. Also transistors are compact and require little space. They have no filament and consequently draw no current from the power line for that purpose. They can be excited by much lower voltages than electron tubes.

Although the above description and drawings describe the circuit of a meter for the measurement of a single phase circuit, polyphase circuits may be measured by combining a plurality of the disclosed meters, and some circuits may use different combinations of sections, such as one voltage section and two current and power factor sections.

*Further details*

In the interests of complete disclosure of one form of the invention found to be functionally satisfactory, various values or constants have been indicated in the drawings. All of the transistors are of the PNP type.

The presently disclosed meter has many advantages over the mechanical meters presently used. It can be made much more compact. It has no moving parts to wear out nor any magnets whose field strength might vary with time. It can be easily calibrated and will maintain its calibration over a long period. Finally, it is accurate within acceptable limits over a load range of at least 100–1 and over a wide power factor range.

Although only one particular circuit has been described in detail and only one set of constants disclosed for the circuit components, other variations may suggest themselves to those skilled in the art. These variations however, are to be considered as coming within the spirit and scope of the present invention except as limited by the appended claims.

It is impratical to manufacture a meter with such accuracy that no adjustment will be necessary. Conventional watthour meters are "calibrated" when manufactured by several adjustments made in connection with tests such as running the meter under comparison with a standard meter. A phasing adjustment can be provided in the illustrated form by adjustability of capacitance 53. After that adjustment has been made, the meter can be adjusted to accuracy with one "main" adjustment, as by adjusting variable resistance 64.

Although experts can choose the best transistors for each purpose that is available when the meters are manufactured, those used at present and found reasonably satisfactory are here noted. For discharge transistor 77, CBS Hytron type 2N158. General Electric type 2N43A is used for amplifying transistor 74. All others are General Electric type 2N43.

I claim:

1. A watthour meter comprising in combination an electrical capacitor, an electrical circuit for producing a current for charging said capacitor which is proportional to the product of the current times the cosine of the phase angle between the voltage and current of the circuit to be metered, means for producing a direct current the voltage of which is inversely proportional to the voltage of the circuit to be metered, means for discharging said capacitor when the potential difference across its terminals is greater than said inversely proportional voltage, and means for counting the number of discharges of said capacitor.

2. A watthour meter according to claim 1 wherein said electrical circuit comprises a means for producing an alternating current proportional to the current of the circuit to be measured, an electronic valving system for said current including transistors, a means for applying a square wave alternating current as a bias for the transistors of said valving system wherein the phase relationship between the voltage of said square wave alternating current and the line current-alternating current is the same as the phase relationship between the line voltage and line current, whereby the out-of-phase component is subtracted from said line proportional current, and means for rectifying the resultant current.

3. A watthour meter according to claim 1 wherein said means for producing a direct current voltage inversely proportional to the line voltage includes a power supply for producing a normally constant direct current voltage which is practically not affected by the fluctuation of said power source, and an opposing power supply for producing a direct current having a smaller voltage proportional to the line voltage.

4. A watthour meter according to claim 1 wherein said capacitor discharging means comprises an electronic circuit comprising a transistor in electrical connection with said capacitor and being normally in a biased condition to prevent the discharge of said capacitor, and means for unbiasing said transistor to allow the discharge of said capacitor therethrough when the potential difference across the terminals of said capacitor exceed the value of said inverse voltage.

References Cited in the file of this patent

UNITED STATES PATENTS

| | | |
|---|---|---|
| 2,615,063 | Brown | Oct. 21, 1952 |
| 2,647,236 | Saunderson et al. | July 28, 1953 |
| 2,663,846 | Gilbert | Dec. 22, 1953 |
| 2,817,817 | Albert | Dec. 24, 1957 |